(12) United States Patent
Murosaki

(10) Patent No.: US 8,446,651 B2
(45) Date of Patent: May 21, 2013

(54) IMAGE READING DEVICE

(75) Inventor: Mikio Murosaki, Ishikawa (JP)

(73) Assignee: PFU Limited, Ishikawa (JP)

( * ) Notice: Subject to any disclaimer, the term of this patent is extended or adjusted under 35 U.S.C. 154(b) by 273 days.

(21) Appl. No.: 13/044,156

(22) Filed: Mar. 9, 2011

(65) Prior Publication Data

US 2011/0286060 A1 Nov. 24, 2011

(30) Foreign Application Priority Data

May 20, 2010 (JP) ................................. 2010-116671

(51) Int. Cl.
*H04N 1/04* (2006.01)
*H04N 1/23* (2006.01)
*H04N 1/00* (2006.01)
*H04N 1/024* (2006.01)
*G06F 3/12* (2006.01)
*G03G 15/00* (2006.01)

(52) U.S. Cl.
USPC .......... 358/498; 358/1.13; 358/400; 358/296; 358/1.15; 358/437; 358/473; 399/392; 382/313

(58) Field of Classification Search
USPC ............... 358/498, 1.13, 400, 196, 1.15, 437, 358/473; 399/392; 382/313
See application file for complete search history.

(56) References Cited

U.S. PATENT DOCUMENTS

| | | | |
|---|---|---|---|
| 4,743,941 A | 5/1988 | Takano | |
| 5,216,472 A * | 6/1993 | Muto et al. | 399/392 |
| 7,656,560 B2 * | 2/2010 | Kasamatsu | 358/400 |
| 2008/0252922 A1 * | 10/2008 | Ikegami et al. | 358/1.15 |
| 2009/0168112 A1 * | 7/2009 | Muraki | 358/296 |
| 2009/0303516 A1 * | 12/2009 | Sai et al. | 358/1.13 |
| 2011/0292474 A1 * | 12/2011 | Wakaura | 358/498 |

FOREIGN PATENT DOCUMENTS

| | | |
|---|---|---|
| JP | 61-192644 | 8/1986 |
| JP | 2004-155095 | 6/2004 |

* cited by examiner

*Primary Examiner* — Charlotte M Baker
*Assistant Examiner* — Rury Grisham
(74) *Attorney, Agent, or Firm* — McDermott Will & Emery LLP

(57) ABSTRACT

An image reading device includes a light source, an imaging unit that captures an image of an original using light from the light source, a conveying unit that conveys the original to the imaging unit, a casing that accommodates at least the imaging unit and the conveying unit, the casing having an insertion slot for feeding the original to the conveying unit, a determination unit that determines whether or not the image reading device is in a conveyable state in which the conveying unit is enabled to convey the original toward the imaging unit, and a notification unit that visually indicates whether or not the image reading device is in an insertion-enabled state enabling the original to be inserted through the insertion slot to the conveying unit based on determination made by the determination unit.

The notification unit is provided above and near the insertion slot outside the casing or inside the insertion slot and between boundary planes, and the boundary planes contain respective opposite horizontal ends of the insertion slot and are perpendicular to a horizontal direction of the insertion slot with the casing being in a placed state.

7 Claims, 8 Drawing Sheets

IMAGE READING DEVICE

CROSS-REFERENCE TO RELATED APPLICATIONS

This application is based upon and claims the benefit of priority from Japanese Patent Application No. 2010-116671, filed May 20, 2010, the entire contents of which are incorporated herein by reference.

BACKGROUND OF THE INVENTION

1. Field of the Invention

The present invention relates to an image reading device.

2. Description of the Related Art

An image reading device is provided with a notification unit for notifying a user of information such as state of a medium or media being fed, insertion position of the medium. Such a notification is exemplarily shown in Japanese Patent Application Laid-open No. 2004-155095 and Japanese Patent Application Laid-open No. S61-192644 and U.S. Pat. No. 4,743,941 and U.S. Pat. No. 5,216,472. One type of image reading device is a manual-feed image reading device in which the user manually feeds an original or a medium to a conveying unit that conveys the original to an imaging unit. Even in such a manual-feed image reading device, there is a demand to read originals successively. To read the originals successively, the user must feed a next original to the conveying unit after completion of reading a preceding original that is currently being read by the imaging unit. More specifically, to read the originals successively, the originals are fed one by one in the judgment of the user.

As described above, in a manual-feed image reading device, originals are fed to the conveying unit in the judgment of the user. Therefore, for example, before completion of reading the preceding original, the user may feed the next original to the conveying unit in order to complete the operation of reading a plurality of originals in a short time. However, this may cause double feed or multi-feed or result in jamming of the originals. Moreover, if a problem occurs during reading of the preceding original, the user may not be aware of an interruption of the conveyance of the preceding original conveyed by the conveying unit and may feed the next original to the conveying unit. In such a case, the originals may be damaged. These are caused by the user's lack of awareness of the state of the originals being fed.

The present invention has been made in view of the above circumstances, and it is an object of the invention to propose an image reading device that allows the user to be sufficiently aware of the state of the originals being fed.

SUMMARY OF THE INVENTION

It is an object of the present invention to at least partially solve the problems in the conventional technology.

According to an aspect of the present invention, an image reading apparatus includes a light source, an imaging unit that captures an image of an original using light from the light source, a conveying unit that conveys the original to the imaging unit, a casing that accommodates at least the imaging unit and the conveying unit, the casing having an insertion slot for feeding the original to the conveying unit, a determination unit that determines whether or not the image reading device is in a conveyable state in which the conveying unit is enabled to convey the original toward the imaging unit, and a notification unit that visually indicates whether or not the image reading device is in an insertion-enabled state enabling the original to be inserted through the insertion slot to the conveying unit based on determination made by the determination unit. The notification unit is provided above and near the insertion slot outside the casing or inside the insertion slot and between boundary planes, and the boundary planes contain respective opposite horizontal ends of the insertion slot and are perpendicular to a horizontal direction of the insertion slot with the casing being in a placed state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The present invention will now be described in detail with reference to the drawings. However, the invention is not limited to the following embodiment. The components in the following embodiment may include those which a person skilled in the art would easily conceive from the embodiments disclosed and those which are substantially equivalent to the components disclosed in the embodiment. In the following description of the embodiment, an image scanner is used as an image reading device, but the invention is not limited thereto. The image reading device may be any device, such as a copying machine, facsimile, or character recognition device, which scans the image of the original with an image sensor.

Figure 1:
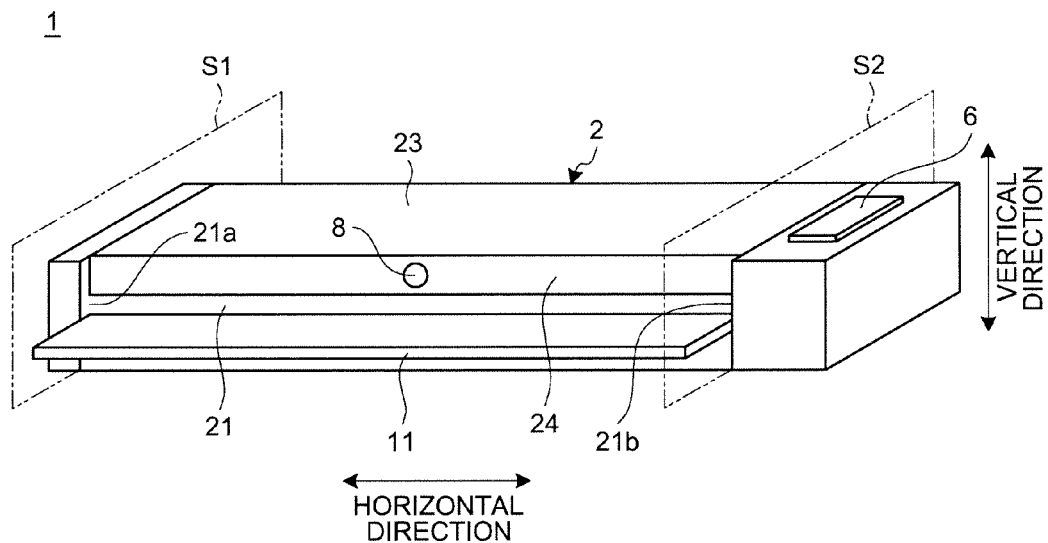
FIG. 1 is a perspective view of an image reading device according to an embodiment.
Figure 2:
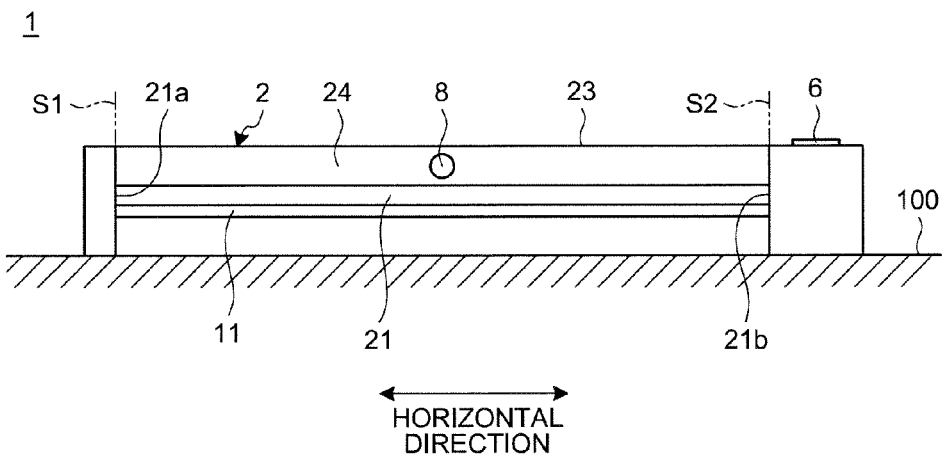
FIG. 2 is a front elevation view of the image reading device according to the embodiment.
Figure 3:
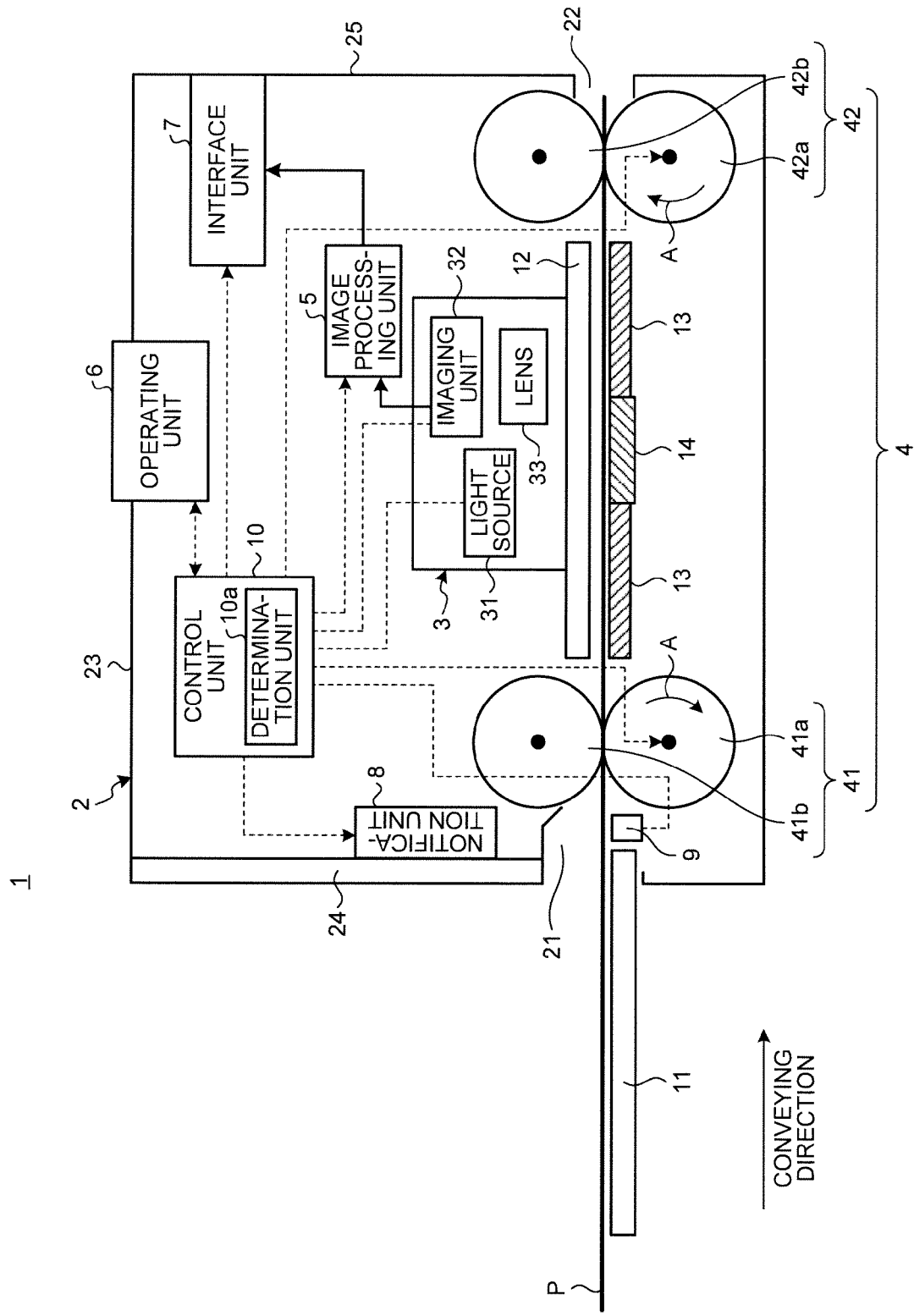
FIG. 3 is a diagram illustrating an exemplary schematic configuration of the image reading device according to the embodiment.

FIG. 1 is an outside view showing a perspective view of an image reading device according to an embodiment. FIG. 2 is an outside view showing a front view of the image reading device according to the present embodiment. FIG. 3 is a diagram illustrating an exemplary schematic configuration of the image reading device according to the present embodiment. An image reading device 1 according to the present embodiment is a manual-feed image reading device and reads the original P, which is a medium to be read, with an imaging unit 32 to generate read image data corresponding to the original P, as shown in FIGS. 1 to 3. The image reading device 1 includes a casing 2, an optical unit 3, a conveying unit 4, an image processing unit 5, an operating unit 6, an interface unit 7, a notification unit 8, a original detection sensor 9, a control unit 10, and a placement stage 11. Reference numeral 12 represents a transparent image reading support member that forms a part of a conveying passage and which is provided with the optical unit 3. Reference numeral 13 represents guide members that form a part of the conveying passage and support the original P conveyed by the conveying unit 4, together with the image reading support member 12 facing the guide members 13. Reference numeral 14 represents a calibration sheet, or a backing section, that is imaged by the imaging unit 32 in order to subject image data generated by the image processing unit 5 to various types of processing, such as white reference calibration and cropping, which will be described later.

The casing 2 accommodates the optical unit 3, the conveying unit 4, the image processing unit 5, the operating unit 6, the interface unit 7, the notification unit 8, the original detection sensor 9, and the control unit 10. The casing 2 has an insertion slot 21 and a discharge slot 22. The insertion slot 21 is formed on a front side 24 that faces the front when the casing 2 is placed on a placement surface 100. The insertion slot 21 is an opening that is formed so as to face first conveying rollers 41, which is described later, of the conveying unit 4 in a conveying direction, and allows the user to insert the original P through the opening to the conveying unit 4. The discharge slot 22 is formed on a rear side 25 that faces the rear when the casing 2 is placed on the placement surface 100. The discharge slot 22 is an opening for discharging the original P that has been captured by the imaging unit 32 of the optical unit 3 and is conveyed by the conveying unit 4, to the outside of the casing 2. The discharge slot 22 is formed so as to face second conveying rollers 42, which is described later, of the conveying unit 4 in the conveying direction.

In the image reading device 1, the optical unit 3 is used to read the original P conveyed by the conveying unit 4. In the embodiment, the optical unit 3 scans the original P in a main scanning direction, which is a direction perpendicular to the plane of FIG. 3. The optical unit 3 includes a light source 31, the imaging unit 32, and a lens 33.

The light source 31 irradiates the original P with light. In the present embodiment, the light source 31 irradiates the original P supported between the image reading support member 12 and the guide members 13 with light. The light source 31 includes LEDs (light emitting diodes) of, for example, R (red), G (green), and B (blue) colors and a light guide member which is not shown in the drawings. The light source 31 is connected to the control unit 10, and the light emitted from each LED driven by a light source driving circuit, which is not shown in the drawings, is directed through the light guide member to the original P or the calibration sheet 14 when no original P is present. The light source driving circuit is provided in the control unit 10 and is controlled by the control unit 10. More specifically, of all of the areas of the original P, the light is projected onto an area in the main scanning direction which faces the imaging unit 32. The light source 31 is controlled by the control unit 10 such that, for example, the ON-OFF order, ON-OFF timing, and ON-OFF period are controlled.

The imaging unit 32 reads the original P conveyed by the conveying unit 4 and is connected to the image processing unit 5. The imaging unit 32 includes sensor elements or imaging elements, which are not shown in the drawings, arranged linearly in the main scanning direction of the original P, or the calibration sheet 14 when no original P is present, facing the optical unit 3. For example, the sensor elements are arranged in a single line in the main scanning direction of the original P, or the calibration sheet 14. Each sensor element outputs, to the image processing unit 5, an output signal based on an output value corresponding to the light incident through the lens 33 e.g., the light emitted from the light source 31 and then reflected from the original P, at each exposure time. Consequently, the imaging unit 32 scans the original P in the main scanning direction with the sensor elements arranged linearly. The imaging unit 32 is connected to the control unit 10, and the control unit 10 performs controlling imaging factors such as exposure timing and exposure period. The control unit 10 allows the exposure of each sensor element of the imaging unit 32 when the light source 31 is activated. In the present embodiment, the control unit 10 allows the exposure of the sensor elements while the LEDs of R, G, and B colors are sequentially turned on, and the sensor elements output signals to the image processing unit 5 at each exposure time.

The lens 33 directs the light reflected from the original P to the imaging unit 32. The lens 33 is disposed between the imaging unit 32 and the image reading support member 12. The lens 33 is, for example, a rod lens array. The light emitted from the light source 31 and reflected from the original P passes through the lens 33, and the erect image of the original P is projected, with equal magnification, onto the linearly arranged sensor elements of the imaging unit 32. The configuration of the optical unit 3 is not limited to that of the present embodiment. For example, the light source 31 may be a white LED, and the sensor elements of the imaging unit 32 may be arranged in three rows.

The conveying unit 4 moves the original P relative to the imaging unit 32. The conveying unit 4 conveys the original P, inserted by the user through the insertion slot 21, to a position facing the imaging unit 32 and discharges the original P through the discharge slot 22 to the outside of the casing 2. The conveying unit 4 includes the pair of first conveying rollers 41, the pair of second conveying rollers 42, motors which are not shown in the drawings, and a motor driving circuit which is not shown in the drawings. The pair of first conveying rollers 41 includes a driving roller 41a and a driven roller 41b that is pressed against the driving roller 41a with a predetermined pressing force, and the driving roller 41a is connected to a motor. The pair of second conveying rollers 42 includes a driving roller 42a and a driven roller 42b that is pressed against the driving roller 42a with a predetermined pressing force, and the driving roller 42a is connected to a motor. The conveying unit 4 is connected to the control unit 10. When the control unit 10 controls the motor driving circuit to rotate the motors, and the motors drive the driving rollers 41a and 42a to rotate, as shown in the direction of arrows A in FIG. 3, and the conveying unit 4 is thereby actuated. The original P, which is inserted by the user through the insertion slot 21, is inserted between the pair of first conveying rollers 41 and conveyed by the rotation of the driving roller 41a in the conveying direction, to be inserted between the pair of second conveying rollers 42, and to be discharged through the discharge slot 22 to the outside of the casing 2. Therefore, while the conveying unit 4 moves the original P relative to the imaging unit 32 in the conveying direction, the imaging unit 32 scans the original P repeatedly in the main scanning direction, whereby the original P is scanned in a sub-scanning direction. In the conveying unit 4, the control unit 10 performs a conveying control of, such as, control timing and conveying speed of the original P. In the present embodiment, the driving rollers 41a and 42a are disposed on the lower side of the casing 2, and the driven rollers 41b and 42b are disposed on the upper side. However, the invention is not limited thereto.

The driven rollers 41b and 42b may be disposed on the lower side, and the driving rollers 41a and 42a may be disposed on the upper side.

The image processing unit 5, which is connected to the interface unit 7, generates read image data of the original P based on the output signals from the imaging unit 32. More specifically, the image processing unit 5 generates line data corresponding to one scan in the main scanning direction and then generates read image data from a plurality of line data sets. The image processing unit 5 is connected to the control unit 10 via the interface unit 7. The control unit 10 controls operation of the image processing unit 5 such as calibration or adjustment of the read image data, cropping of the read image data, and outputting of the read image data to other devices connected to the image reading device 1 through the interface unit 7.

The operating unit 6 at least instructs the image reading device 1 to read the original P. The operating unit 6 is connected to the control unit 10. The operating unit 6 is, for example, a switch provided with a light source or a touch panel provided with a light source. The operating unit 6 outputs an instruction based on the operation of the user, for example, an instruction signal such as a reading start instruction, to the control unit 10. The control unit 10 controls changes such as changes of states of illumination, e.g., ON-OFF timing or a light amount, of the light source, changes of colors of the light source, changes of characters to be displayed on the operating unit 6, thereby causing the operating unit 6 to display the status of the image reading device 1. The operating unit 6 is disposed so as to be exposed to the outside of the casing 2 so that the user can recognize the status of the image reading device 1 on the basis of the display. In the present embodiment, the operating unit 6 is disposed on the casing 2 at a position outside the region between boundary planes S1 and S2, which will be described later, for example, on a upper surface 23 at a position outside the region between the boundary planes S1 and S2.

The interface unit 7 connects the image reading device 1 to an external device and is connected to the control unit 10. The interface unit 7 is configured to output the read image data generated by the image processing unit 5 to the external device connected and to receive or input data or instruction such as setting data of the image reading device 1 and operation instructions from the external device. The image reading device 1 may include a memory unit and may store the read image data generated by the image processing unit 5 in the memory unit prior to connection to the external device, and when the image reading device 1 is connected to the external device, the read image data stored in the memory unit may be outputted to the external device.

The notification unit 8 is configured to visually indicate whether or not the image reading device is in an insertion-enabled state and notifies the user of whether or not the image reading device 1 is in an insertion-enabled state in which the image reading device 1 enables the original P to be inserted through the insertion slot 21 to the conveying unit 4. Therefore, function of the notification unit 8 is different from the operating unit 6. The notification unit 8 is connected to the control unit 10 and allows the user to visually recognize whether or not the image reading device 1 is in the insertion-enabled state that is determined by a determination unit 10a of the control unit 10, which will be described later. The notification unit 8 changes its display, and the change in display allows the user to visually recognize whether or not the image reading device 1 is in the insertion-enabled state. In the present embodiment, the notification unit 8 includes a light source such as an LED to emit light to the outside. The notification unit 8 is controlled by the control unit 10 so as to light up when the determination unit 10a determines that the image reading device 1 is in a conveyable state, and to blink when the determination unit 10a determines that the image reading device 1 is not in the conveyable state. More specifically, the notification unit 8 changes its display from "lighting" to "blinking" and from "blinking" to "lighting." Therefore, the user can visually recognize that the image reading device 1 is in the insertion-enabled state when the notification unit 8 lights up, or in an insertion prohibited state when the notification unit 8 blinks. The notification unit 8 is disposed on the casing 2 at a position above and near the insertion slot 21 and between the boundary planes S1 and S2. The boundary planes S1 and S2 are planes that are perpendicular to the horizontal direction of the insertion slot 21 with the casing 2 being in a placed state, i.e., a state where the casing 2 is placed on a placement surface 100, and contain opposite horizontal ends 21a and 21b of the insertion slot 21, respectively. In the present embodiment, the notification unit 8 is disposed on the front side 24 of the casing 2 at a horizontal central portion above the insertion slot 21 and between the boundary planes S1 and S2.

The original detection sensor 9 is configured to detect the original P inserted through the insertion slot 21 to the conveying unit 4. In the present embodiment, the original detection sensor 9 is disposed in the conveying passage between the insertion slot 21 and the conveying unit 4. The original detection sensor 9 is connected to the control unit 10. When the user inserts the original P through the insertion slot 21 to the conveying unit 4, the original detection sensor 9 outputs a detection signal that indicates the detection of the original P to the control unit 10. The original detection sensor 9 may be an optical sensor or a mechanical sensor. Preferably, the original detection sensor 9 can detect the original P irrespective of a horizontal position within the insertion slot 21 through which the original P inserted. Therefore, the present embodiment can provide the image reading device 1 in which the original P can be freely placed, or can be inserted at any position within the insertion slot 21.

The control unit 10 is configured to control the image reading device 1. The control unit 10 functions also as the determination unit 10a. The determination unit 10a determines whether or not the image reading device 1 is in a conveyable state in which the conveying unit 4 can convey the original P toward the imaging unit 32 by the conveying unit 4. The determination unit 10a determines whether or not the image reading device 1 is in the conveyable state on the basis of the output results from the original detection sensor 9. The conveyable state is a state in which the imaging unit 32 can read original P normally when the original P inserted through the insertion slot 21 to the conveying unit 4 is conveyed to the imaging unit 32 by the conveying unit 4. The determination unit 10a determines that the image reading device 1 is in the conveyable state, when, for example, a state in which the original detection sensor 9 does not detect any original P continues for a conveying time. The conveying time is defined as, for example, a period of time spanning from a time when the original P conveyed by the conveying unit 4 is no longer detected by the original detection sensor 9 to a time when the trailing end of this original P, which is an end in the direction opposite to the conveying direction of the original P, passes through the imaging unit 32. Alternatively, the conveying time is defined as a period of time spanning from a time when the original P conveyed by the conveying unit 4 is no longer detected by the original detection sensor 9 to a time when the trailing end of the original P, which is the end in the direction opposite to the conveying direction of the original P, passes through the pair of second conveying rollers 42.

The placement stage 11 is configured to guide the original P to the insertion slot 21 of the casing 2 when the original P is inserted into the insertion slot 21. The placement stage 11 is rotatably supported at one of its short-side ends by the casing 2. When the image reading device 1 is not in use, the user may rotate the placement stage 11 to a storage position or closed position at which the placement stage 11 closes the insertion slot 21, namely, the storage position is a position at which the placement stage 11 is parallel to the vertical direction. At the storage position, the placement stage 11 is held by a placement stage holding mechanism, which is not shown in the drawings. Before the image reading device 1 is in use, the user rotates the placement stage 11 held in the storage position to an unfolded position or open position at which the insertion slot 21 is exposed to the outside, namely, the unfolded position is a position at which the placement stage 11 is parallel to the conveying direction. At the unfolded position, the rotation of the placement stage 11 is prevented by the placement stage holding mechanism, which is not shown in the drawings, and the upper surface of the placement stage 11 is substantially parallel to the conveying direction.

Figure 4:
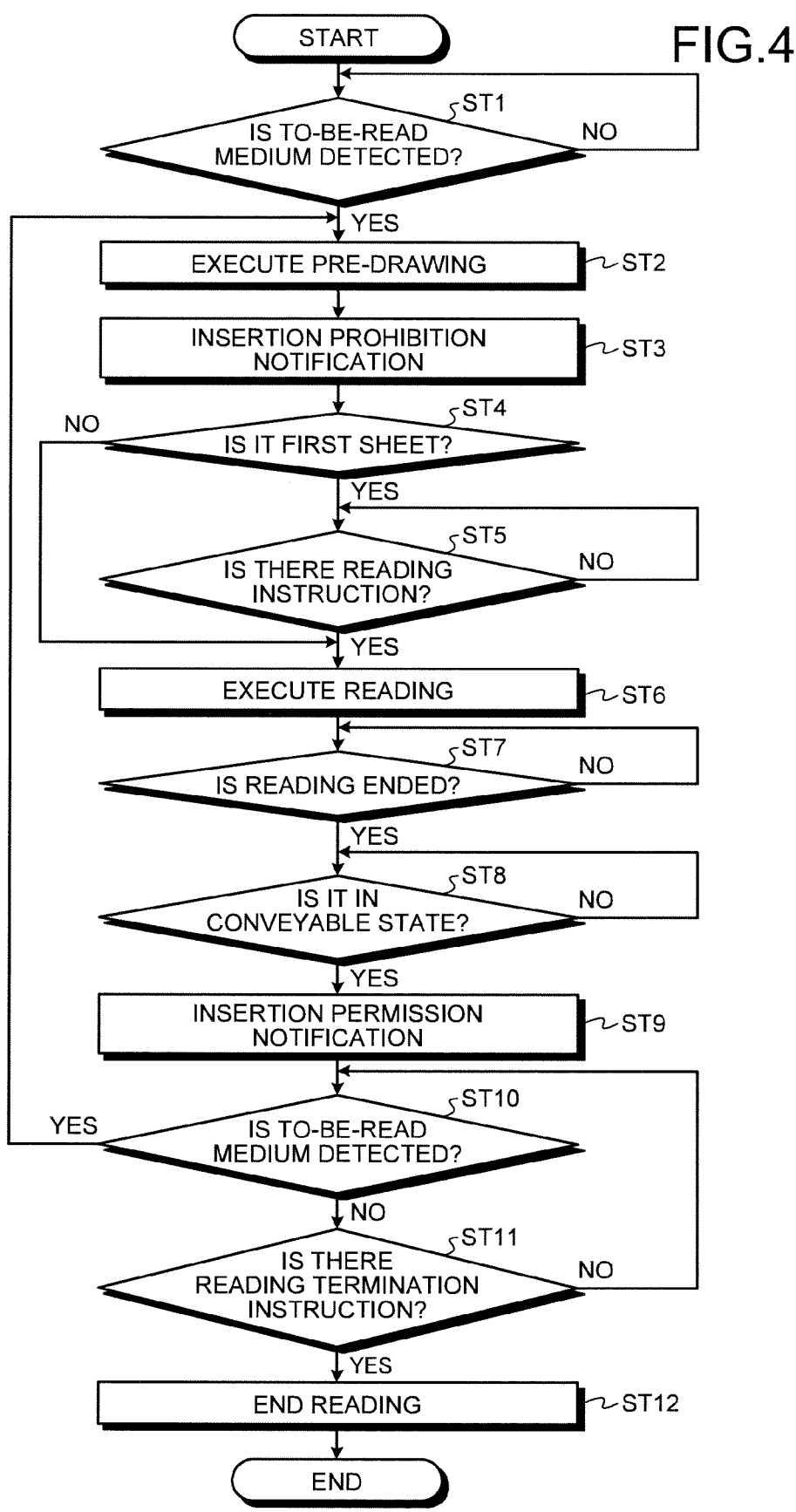
FIG. 4 is a flowchart showing the operation of the image reading device according to the embodiment.

The operation of the image reading device 1 according to the present embodiment will now be described. FIG. 4 is a flowchart showing the operation flow of the image reading device according to the present embodiment.

First, the control unit 10 determines whether or not the original P has been detected (step ST1). In step ST1, the control unit 10 determines whether or not the original detection sensor 9 has detected the original P to determine whether or not the original P inserted by the user through the insertion slot 21 has reached the conveying unit 4.

Next, when a determination is made that the original P has been detected (YES in step ST1), the control unit 10 performs preparatory insertion (step ST2). In the preparatory insertion, when a determination is made that the original P has been inserted by the user through the insertion slot 21 to the conveying unit 4, the control unit 10 operates the conveying unit 4 for a short time, i.e., for several seconds. The leading end of the original P, which is the end in the conveying direction of the original P, in contact with the pair of first conveying rollers 41 is thereby inserted between the driving roller 41a and the driven roller 41b, whereby the original P is held by the conveying unit 4.

Next, the control unit 10 issues insertion prohibition notification (step ST3). In step ST3, to allow the user to visually recognize that the image reading device 1 is in an insertion prohibited state, the control unit 10 causes the notification unit 8 to blink when the notification unit 8 lights up.

Next, the control unit 10 determines whether or not the original P is a first sheet (step ST4). In step ST4, the control unit 10 determines whether or not the original P inserted by the user through the insertion slot 21 to the conveying unit 4 is a first original P in the original reading operation of the image reading device 1.

Next, the control unit 10 determines whether or not a reading instruction has been issued (step ST5). In step ST5, the control unit 10 determines whether or not the user has operated the operating unit 6 to issue an instruction signal for starting reading based on the user's operation. When a determination is made that no reading instruction has been issued (NO in step ST5), the control unit 10 repeats step ST5 until a reading instruction is issued.

Next, when a determination is made that a reading instruction has been issued (YES in step ST5), the control unit 10 executes reading of the original P (step ST6). In the reading processing, the original P is imaged by the imaging unit 32 according to the light emitted from the light source 31 and reflected from the original P. In step ST6, the control unit 10 performs the lighting control of the light source 31, the imaging control of the imaging unit 32, and the conveying control of the conveying unit 4 and causes the conveying unit 4 to convey the original P to the imaging unit 32. Then the control unit 10 executes reading processing until at least the trailing end of the original P currently read is conveyed by the conveying unit 4 to the imaging unit 32. When a determination is made that the detected original P is not the first sheet, i.e., the detected original P is a second or later sheet (NO in step ST4), the control unit 10 executes the reading of the detected original P. More specifically, in the original reading operation in the image reading device 1, when a determination is made that a second or later original P has been detected, the reading of the second or later original P is executed without waiting for any reading instruction.

Next, the control unit 10 determines whether or not the reading of the detected original P has been completed (step ST7). In step ST7, the control unit 10 determines whether or not the reading of the original P has been completed. When a determination is made that the reading of the original P has not been completed (NO in step ST7), the control unit 10 repeats step ST7 until completion of the reading.

Next, when a determination is made that the reading of the original P has been completed (YES in step ST7), the determination unit 10a of the control unit 10 determines whether or not the image reading device 1 is in the conveyable state (step ST8). In step ST8, the determination unit 10a determines, on the basis of the output results from the original detection sensor 9, whether or not the image reading device 1 is in the conveyable state, as described above. When a determination is made that the image reading device 1 is not in the conveyable state (NO in step ST8), the control unit 10 repeats step ST8 until the conveyable state is achieved.

Next, when a determination is made that the image reading device 1 is in the conveyable state (YES in step ST8), the control unit 10 issues insertion-enabled notification (step ST9). In step ST9, the control unit 10 causes the notification unit 8 to light up, when the notification unit 8 blinks, in order to allow the user to visually recognize that the image reading device 1 is in the insertion-enabled state.

Next, the control unit 10 determines whether or not original P has been detected (step ST10). When a determination is made that original P has been detected (YES in step ST10), i.e., a second or later original S has been detected, the control unit 10 repeats steps ST2 to ST10 until no original P is detected.

Next, When a determination is made that no original P has been detected (NO in step ST10), the control unit 10 determines whether or not a reading termination instruction has been issued (step ST11). In step ST11, the control unit 10 determines whether or not, for example, the user has operated the operating unit 6 to issue the instruction signal of the reading termination instruction based on the user's operation. When a determination is made that no reading termination instruction has been issued (NO in step ST11), the control unit 10 repeats steps ST10 and ST11 until the original P is detected or the reading termination instruction is issued.

Next, When a determination is made that the reading termination instruction has been issued (YES in step ST11), the control unit 10 stops the original reading operation in the image reading device 1 (step ST12). The current control cycle is thereby ended, and a next control cycle is started. For example, the process returns to step ST1 with the notification unit 8 staying on, and the control unit 10 determines whether or not the original P has been detected (step ST1) until the power source of the image reading device 1 is turned off.

As described above, in the image reading device 1 according to the present embodiment, the notification unit 8 disposed near the insertion slot 21 through which the original P is inserted, and when the image reading device 1 is in the conveyable state, the notification unit 8 lights up to provide insertion-enabled notification to the user. When the image reading device 1 is not in the conveyable state, the notification unit 8 blinks to provide the user with insertion prohibition notification. Therefore, since the notification unit 8 is disposed at a position to which the user pays attention during conveyance of the original P, the user can adequately recognize the state of the original P being fed or conveyed.

Example 1

Users' recognition of the insertion-enabled state in the image reading device 1 according to the present embodiment was compared with that in a conventional image reading device. The conventional image reading device was similar to the image reading device 1 according to the present the embodiment except that the conventional image reading device was not provided with the notification unit 8. In the conventional image reading device, its operating unit 6 lights up when the device is in the conveyable state and blinks when the device is not in the conveyable state. The users were persons who first used the image reading device 1 according to the present embodiment. Eleven users were asked to perform reading of originals P on the image reading device 1 according to the present embodiment and on the conventional image reading device. Consequently, in the conventional image reading unit, only one user was aware of the blinking of the operating unit 6 and 10 users were unaware of the blinking of the operating unit 6. However, in the image reading device 1 according to the present embodiment, all the 11 users were aware of the blinking of the notification unit 8, and none was unaware of the blinking of the notification unit 8. Therefore, the notification of the insertion-enabled state by the notification unit 8 can allow the user to adequately recognize the state of the original P being fed or conveyed.

Figure 5:
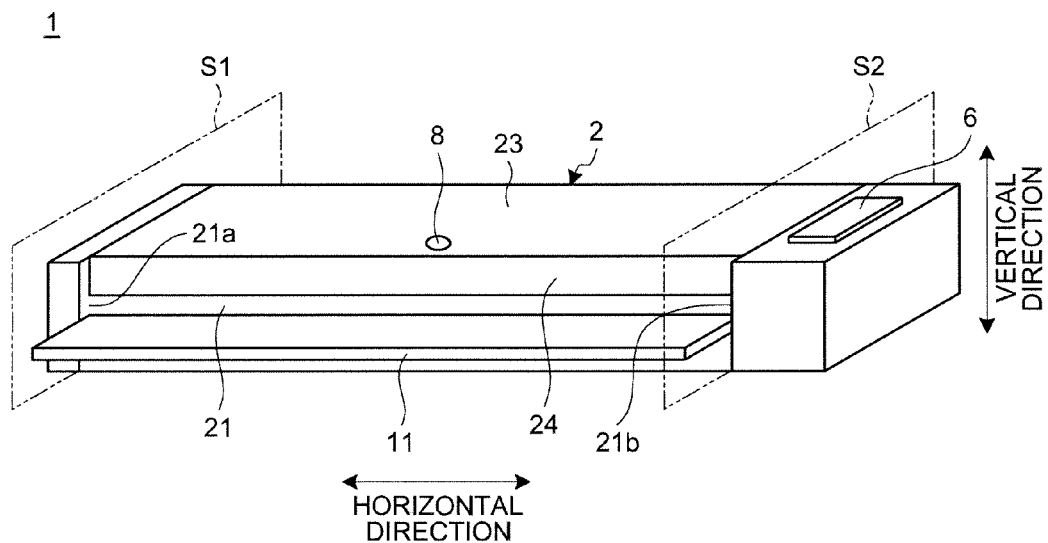
FIG. 5 is a diagram illustrating a first modification of the image reading device according to the embodiment.
Figure 6:
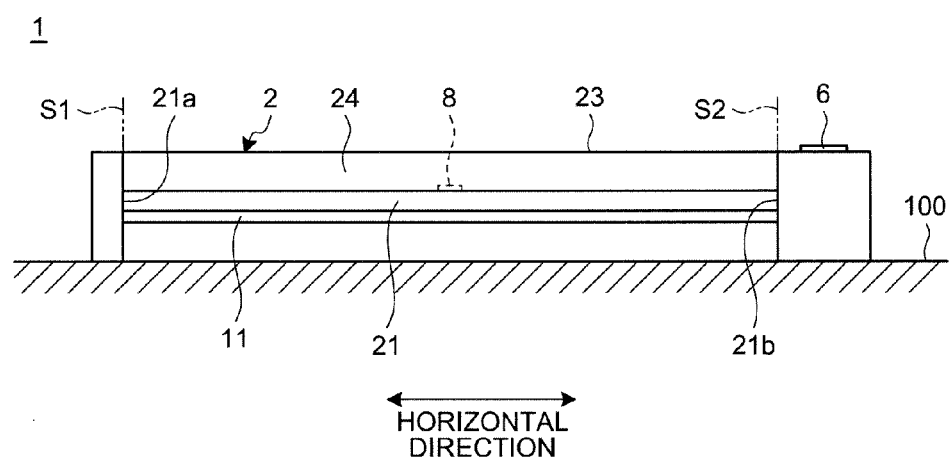
FIG. 6 is a diagram illustrating a second modification of the image reading device according to the embodiment.

In the above embodiment, the notification unit 8 is disposed on the front side 24 of the casing 2, but the present invention is not limited thereto. FIG. 5 shows a first modification of the image reading device according to the present embodiment. FIG. 6 shows a second modification of the image reading device according to the present embodiment. As shown in FIG. 5, the notification unit 8 may be disposed on the upper surface 23 of the casing 2 at a position near the insertion slot 21, or more specifically at the horizontal central portion above the insertion slot 21 between the boundary planes S1 and S2. In this case, it is preferable to dispose the notification unit 8 on the upper surface 23 at a position on the side opposite to the conveying direction side, i.e., a position close to the insertion slot 21. Alternatively, the notification unit 8 may be disposed inside the insertion slot, as shown in FIG. 6. In this case, it is preferable to dispose the notification unit 8 at a position inside the insertion slot 21 at which light can be emitted to the outside even during conveyance of the original P, for example, at the upper central portion inside the insertion slot 21.

In the above embodiment, one notification unit 8 is provided, but provision of the notification unit 8 is not limited to above embodiment. A plurality of notification units 8 may be provided. For example, a plurality of notification units 8 may be provided on a single surface, inside the insertion slot, or on different surfaces. These may be provided near the insertion slot and inside the insertion slot.

Figure 7:
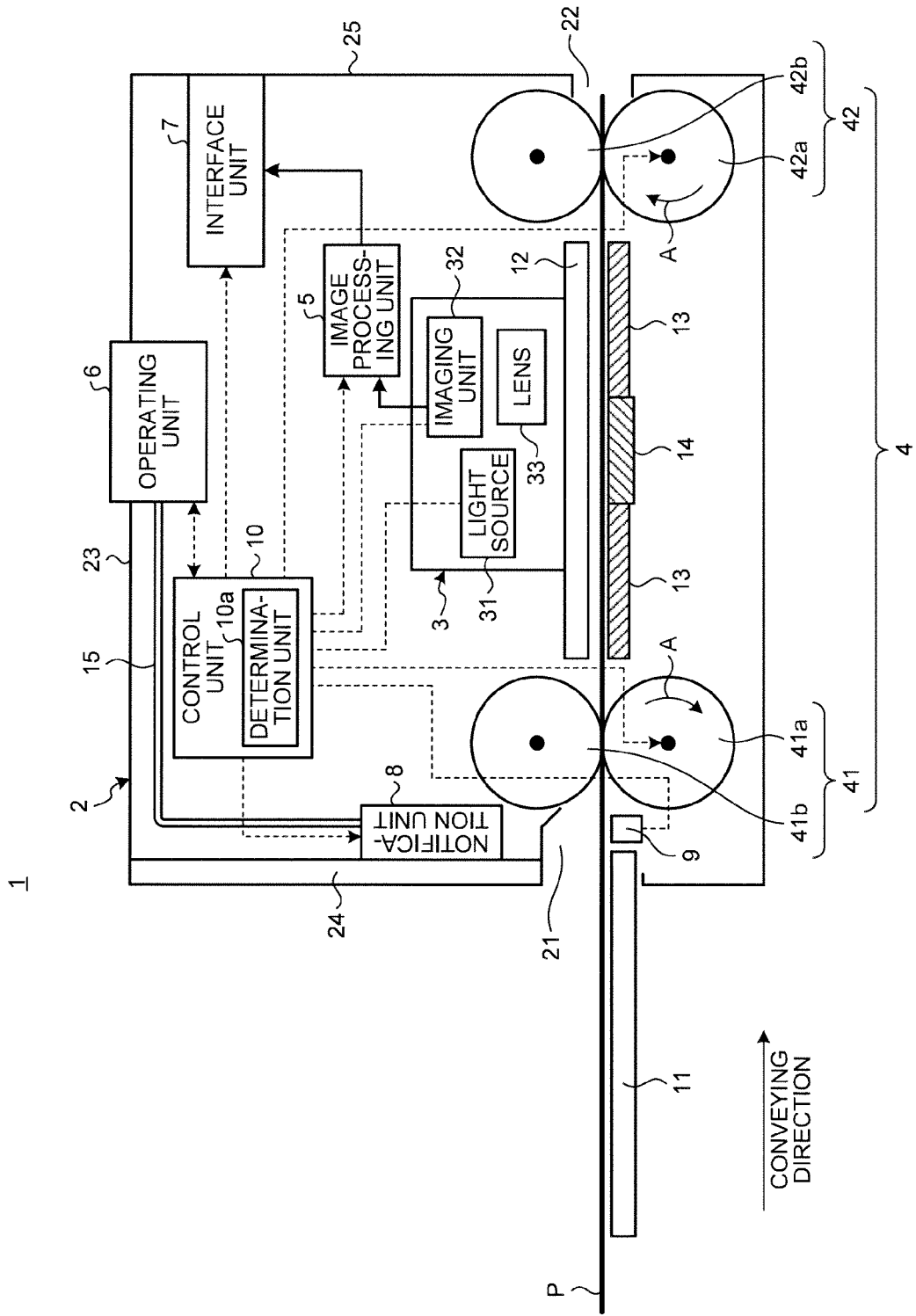
FIG. 7 is a diagram illustrating a third modification of the image reading device according to the embodiment.

In the above embodiment, the notification unit 8 is provided with a light source controlled by the control unit 10, but the invention is not limited thereto. FIG. 7 shows a third modification of the image reading device according to the present embodiment. As shown in FIG. 7, the notification unit 8 may be illuminated with the light emitted from a light source provided in the operating unit 6. Specifically, an existing light source that is used during operation performed when the imaging unit 32 captures the image of the original P is used as a light source and the light from the operating unit 6 may be fed to a position near the insertion slot, or inside the insertion slot, through a light guide member 15 for illumination. In this case, the control unit 10 causes the operating unit 6 to light up when the image reading device 1 is in the conveyable state and to blink when the image reading device 1 is not in the conveyable state. In this manner, the notification unit 8 also lights up when the image reading device 1 is in the conveyable state and blinks when the image reading device 1 is not in the conveyable state. Therefore, since no light source for emitting light to the outside is required for the notification unit 8, the number of components can be reduced, and the cost can thereby be reduced. Alternatively, the light from the light source 31 may be emitted to the outside from a position near the insertion slot, or inside the insertion slot, through the light guide member 15.

In the above embodiment, the notification unit 8 changes its display by allowing the notification unit 8 to light up when the image reading device is in the conveyable state and to blink when the image reading device is not in the conveyable state. This changeable display allows the user to visually recognize whether or not the image reading device is in the insertion-enabled state, but the invention is not limited thereto. The display on the notification unit 8 may be changed in any manner so long as the user is allowed to visually recognize whether or not the image reading device is in the insertion-enabled state. For example, the notification unit 8 may light up when the image reading device is in the conveyable state and may be turned off when the image reading device is not in the conveyable state. The notification unit 8 may change its display color to allow the user to recognize the conveyable state. The notification unit 8 may display predetermined characters, for example, "INSERT DOCUMENT" when the image reading device is in the conveyable state and "DO NOT INSERT DOCUMENT" when the image reading device is not in the conveyable state, through the light emitted from a light source to the outside.

Figure 8:
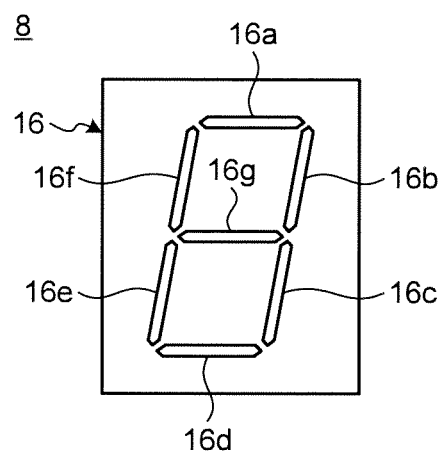
FIG. 8 is a diagram illustrating a modification of a notification unit.

FIG. 8 shows a modification of the notification unit. As shown in FIG. 8, the notification unit 8 may be a seven-segment display 16. The seven-segment display 16 includes seven segments 16a to 16g, and the display of each of the segments 16a to 16g is controlled by the control unit 10. When the notification unit 8 is the seven-segment display 16, its display may be changed such that, for example, the segments 16b and 16c light up when the image reading device is in the conveyable state and that the segments 16a to 16f blink repeatedly in a sequential manner when the image reading device is not in the conveyable state. In this manner, the user is allowed to visually recognize whether or not the image reading device is in the insertion-enabled state. The number of the seven-segment display 16 used as the notification unit 8 is not limited to one. A plurality of seven-segment displays 16 may be used. A dot matrix display, for example, may also be used.

Figure 9:
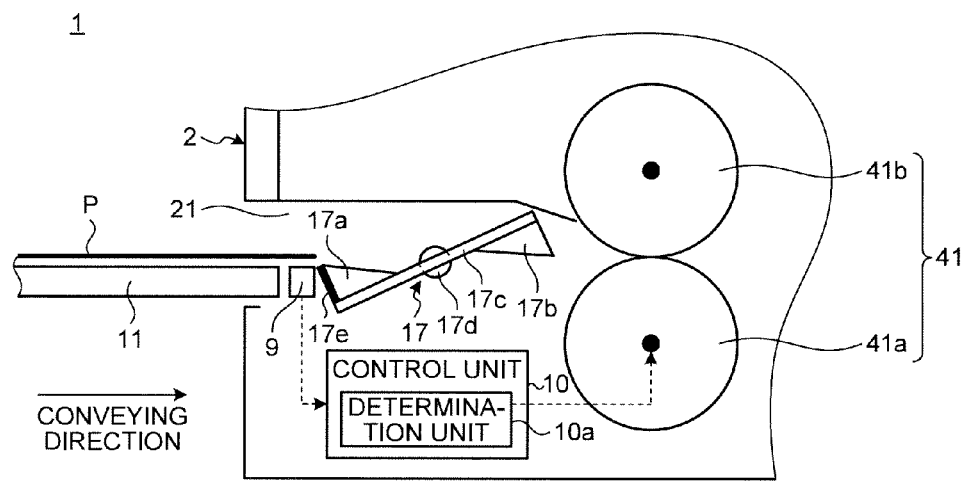
FIG. 9 is a diagram illustrating an exemplary structure of a restriction mechanism.
Figure 10:
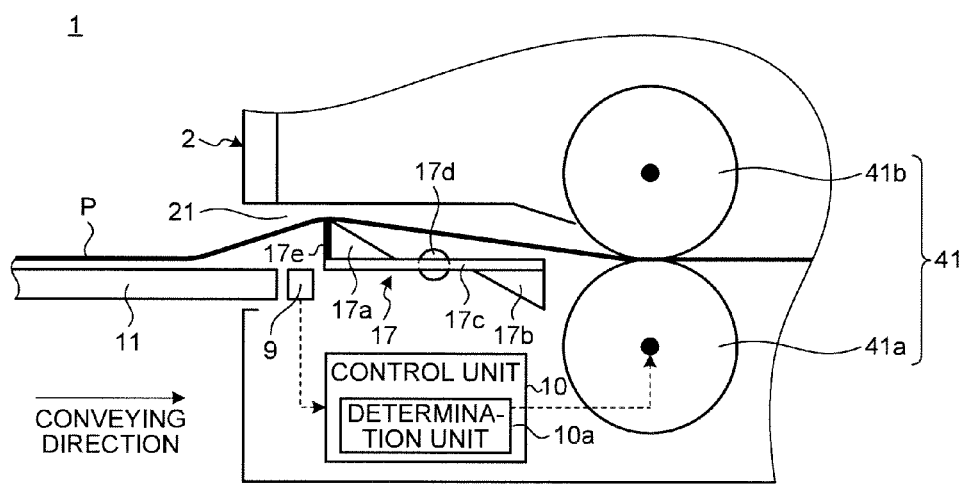
FIG. 10 is a diagram illustrating the operation of the restriction mechanism.
Figure 11:
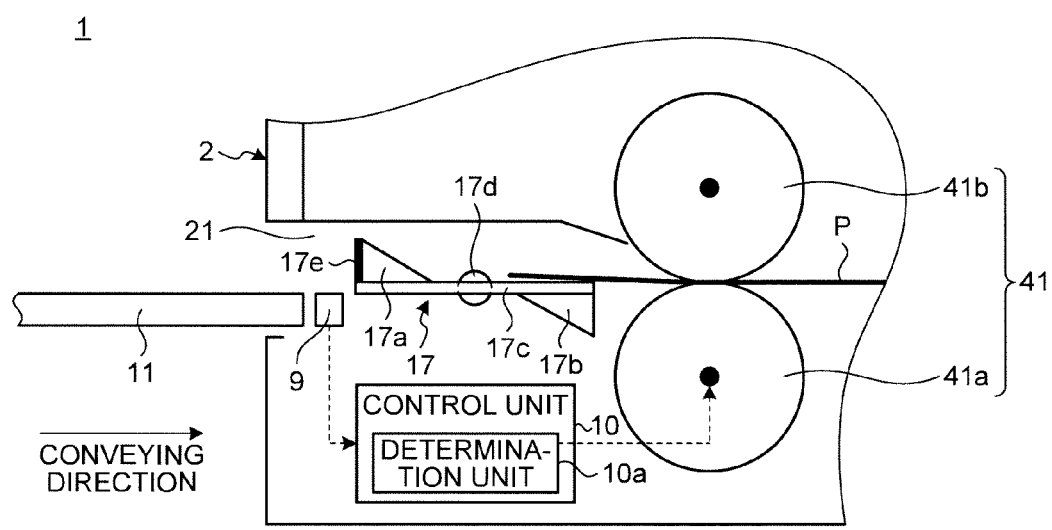
FIG. 11 is a diagram illustrating the operation of the restriction mechanism.

In the above embodiment, the insertion of the original P through the insertion slot 21 may be interrupted when the image reading device is not in the insertion-enabled state. FIG. 9 is a diagram illustrating an exemplary structure of a restriction mechanism. FIG. 10 is a diagram illustrating the operation of the restriction mechanism. FIG. 11 is another diagram illustrating the operation of the restriction mechanism. As shown in FIGS. 9 to 11, a restriction mechanism 17 may be provided between the insertion slot 21 and the conveying unit 4. The restriction mechanism 17 closes the insertion slot 21 when the image reading device is not in the insertion-enabled state to restrict the insertion of the original P. The restriction mechanism 17 includes a restriction member 17a, a weight member 17b, a support member 17c, a rotation shaft 17d, and an elastic member which is not shown in the drawings. The restriction member 17a is configured to close the insertion slot 21 and is provided at a first short-side end, which is left end in FIGS. 9 to 11, of the support member 17c. The restriction member 17a has a notifying surface 17e that is formed on the side opposite to the conveying direction side, i.e., on the side close to the insertion slot 21. The notifying surface 17e is used to notify the user of the insertion prohibited state through a color or characters. The weight member 17b is configured to balance the restriction member 17a on the support member 17c and provided at a second short-side end, which is right end in FIGS. 9 to 11, of the support member 17c. The weight member 17b is provided on a surface of the support member 17c which is opposite to the surface where the restriction member 17a is provided. The support member 17c is supported by the rotation shaft 17d so as to be rotatable relative to the casing 2. The rotation range of the support member 17c is restricted by a stopper which is not shown in the drawings. More specifically, the rotation range is from a restriction position at which the restriction member 17a closes the insertion slot 21 to a release position at which the closed insertion slot 21 is opened. At the restriction position the user is prevented from inserting the original P through the insertion slot 21 to the conveying unit 4, and at the release position the user is allowed to insert the original P through the insertion slot 21 to the conveying unit 4. The elastic member is configured to exert urging force on the support member 17c so that the restriction member 17a is urged to the release position when no external force is exerted on the restriction mechanism 17. The elastic member exerts, on the support member 17c, an urging force strong enough to allow the restriction member 17a to move to the restriction position when the original P in contact with the support member 17c is being conveyed by the conveying unit 4.

In the restriction mechanism 17, when no original P is inserted through the insertion slot 21 into the casing 2, the restriction member 17a is located at the release position by the urging force of the elastic member. Therefore, the user can insert the original P through the insertion slot 21 to the conveying unit 4. When the original P is inserted by the user through the insertion slot 21 to the conveying unit 4 and is conveyed by the conveying unit 4, the support member 17c rotates and the restriction member 17a is located at the restriction position, as shown in FIG. 10. When the conveyed original P has passed through the restriction member 17a and is still passing the restriction mechanism 17, as shown in FIG. 11, the restriction member 17a is held at the restriction position and the insertion slot 21 remains closed. Therefore, the user can visually observe the notifying surface 17e through the insertion slot 21. A timing at which the conveyed original P has passed through the restriction mechanism 17 is the same as the timing at which the determination unit 10a determines that the image reading device is in the conveyable state. Therefore, at the timing at which the conveyed original P has passed through the restriction mechanism 17, i.e., at the timing at which the determination unit 10a determines that the image reading device is in the conveyable state, the restriction member 17a moves to the release position, as shown in FIG. 9. In this manner, the user can recognize the insertion-enabled state from the movement of the restriction mechanism 17.

The restriction mechanism 17 is not limited to a mechanism that rotates to open and close the insertion slot 21, as described above. A mechanism that moves vertically to open and close the insertion slot 21 may be used. The restriction mechanism 17 is not limited to that provided between the insertion slot 21 and the conveying unit 4, and may be provided on a side opposite to the conveying unit 4 relative to the insertion slot 21. For example, the restriction mechanism 17 may be provided on the placement stage 11.

In the image reading device according to the present invention, the notification unit is provided at a position to which the user pays attention during conveyance of the original. Therefore, advantageously, the user can adequately recognize the state of the original being fed or conveyed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a light source;
an imaging unit that captures an image of an original using light from the light source;
a conveying unit that conveys the original to the imaging unit;
a casing that accommodates at least the imaging unit and the conveying unit, the casing having an insertion slot for feeding the original to the conveying unit;
a determination unit that determines whether or not the image reading device is in a conveyable state in which the conveying unit is enabled to convey the original toward the imaging unit; and
a notification unit that visually indicates whether or not the image reading device is in an insertion-enabled state enabling the original to be inserted through the insertion slot to the conveying unit based on determination made by the determination unit, wherein
the notification unit is provided above and near the insertion slot outside the casing or inside the insertion slot and between boundary planes, and the boundary planes contain respective opposite horizontal ends of the insertion slot and are perpendicular to a horizontal direction of the insertion slot with the casing being in a placed state.

2. The image reading device according to claim 1, wherein the notification unit is provided at a position on a front side where the insertion slot is formed.

3. The image reading device according to claim 1, wherein the notification unit is provided at a position on an upper surface of the casing.

4. The image reading device according to claim 1, wherein the notification unit changes its display for visually indicating whether or not the image reading device is in the insertion-enabled state.

5. The image reading device according to claim 1, further comprising a restriction mechanism for restricting insertion of the original through the insertion slot, and wherein
the restriction mechanism restricts the insertion of the original through the insertion slot when the image reading device is not in the insertion-enabled state.

6. The image reading device according to claim 1, wherein the notification unit includes a light source, the light source being the existing light source that is used during operation performed when the imaging unit captures the image of the original.

7. The image reading device according to claim 1, further comprising an operating unit for issuing an instruction to read the original, the operating unit being different from the notification unit.

* * * * *